United States Patent
Takahashi et al.

(10) Patent No.: US 11,353,090 B2
(45) Date of Patent: Jun. 7, 2022

(54) SPEED REDUCER

(71) Applicant: NABTESCO CORPORATION, Tokyo (JP)

(72) Inventors: Masahiro Takahashi, Tokyo (JP); Yuto Nakai, Tokyo (JP); Shunsuke Kimura, Tokyo (JP)

(73) Assignee: NABTESCO CORPORATION, Tokyo (JP)

(*) Notice: Subject to any disclaimer, the term of this patent is extended or adjusted under 35 U.S.C. 154(b) by 0 days.

(21) Appl. No.: 16/732,438

(22) Filed: Jan. 2, 2020

(65) Prior Publication Data
US 2020/0325963 A1 Oct. 15, 2020

(30) Foreign Application Priority Data

Apr. 15, 2019 (JP) .............................. JP2019-076838

(51) Int. Cl.
*F16H 1/32* (2006.01)
*F16H 1/28* (2006.01)
*H02K 7/116* (2006.01)

(52) U.S. Cl.
CPC ............. *F16H 1/32* (2013.01); *F16H 1/2863* (2013.01); *H02K 7/116* (2013.01); *F16H 2001/323* (2013.01)

(58) Field of Classification Search
CPC .......... F16H 1/32–2001/328; B62D 3/00–5/32
See application file for complete search history.

(56) References Cited

U.S. PATENT DOCUMENTS

| 3,631,736 | A | * | 1/1972 | Saari | F16H 55/08 |
| | | | | | 74/462 |
| 8,235,856 | B2 | * | 8/2012 | Nakamura | F16H 1/32 |
| | | | | | 475/168 |
| 8,684,879 | B2 | * | 4/2014 | Nakamura | F16H 3/70 |
| | | | | | 475/179 |
| 8,920,278 | B2 | * | 12/2014 | Tanaka | F24S 30/452 |
| | | | | | 475/162 |
| 2016/0061292 | A1 | * | 3/2016 | Mizuhashi | F16H 1/32 |
| | | | | | 475/162 |
| 2017/0314644 | A1 | * | 11/2017 | Sugishita | F16H 1/32 |
| 2019/0162281 | A1 | * | 5/2019 | Nakamura | F16H 37/041 |

FOREIGN PATENT DOCUMENTS

| JP | 2016-089916 A | 5/2016 | |
| WO | WO-2009057526 A1 * | 5/2009 | ............... F16H 1/32 |

* cited by examiner

*Primary Examiner* — Sherry L Estremsky
(74) *Attorney, Agent, or Firm* — Pillsbury Winthrop Shaw Pittman, LLP

(57) ABSTRACT

A speed reducer according to one embodiment of the present invention includes a crankshaft and a speed reducing mechanism. The crankshaft includes a gear portion driven by rotation from a drive source and a journal portion formed integrally with the gear portion. The crankshaft rotates about an axis of the journal portion. The speed reducing mechanism decelerates rotation of the crankshaft and outputs the decelerated rotation.

9 Claims, 5 Drawing Sheets

SPEED REDUCER

CROSS-REFERENCE TO RELATED APPLICATIONS

This application is based on and claims the benefit of priority from Japanese Patent Application Serial No. 2019-076838 (filed on Apr. 15, 2019), the contents of which are hereby incorporated by reference in their entirety.

TECHNICAL FIELD

The present invention relates to a speed reducer.

BACKGROUND

Speed reducers have been used in industrial robots, machine tools, and various other types of machines that operate by torque input. Such a speed reducer decelerates rotation inputted from a drive source such as an electric motor and outputs the decelerated rotation to a subject device to be driven. An eccentric oscillating speed reducer is known as a type of speed reducer. Japanese Patent Application Publication No. 2016-89916 describes a conventional eccentric oscillating speed reducer.

The conventional eccentric oscillating speed reducer includes an input gear for transmitting rotation from a drive source, a spur gear meshing with the input gear, a crankshaft including an eccentric portion, an external gear mounted to the crankshaft via the eccentric portion, a case having internal teeth meshing with the external gear, and a carrier provided rotatably relative to the case. The carrier and the external gear each have a hollow portion extending along an axis of the case. Wiring connected to the drive source and to a subject device is housed in the hollow portion. In the eccentric oscillating speed reducer configured as above, rotation from the drive source is transmitted from the input gear to the crankshaft via the spur gear. When the crankshaft rotates, the external gear also rotates as a result of being pressed by the eccentric portion. The rotation of the external gear causes the carrier to rotate relative to the case. By this configuration, decelerated rotation is outputted from the carrier or the case to the subject device to be driven.

In the conventional speed reducer, rotation from the input gear is inputted to the crankshaft via the spur gear. Because of this, undesirably, a radial dimension of the speed reducer is defined by the spur gear. This might result in a decreased degree of design freedom of various constituent components of the speed reducer in terms of radial dimensions thereof.

In the conventional speed reducer, the spur gear is mounted to the crankshaft by spline connection. This might result in occurrence of a backlash between the spur gear and the crankshaft.

SUMMARY

An object of the present invention is to solve or alleviate at least some of the above-described problems with the conventional technique.

More specifically, one object of the present invention is to provide a speed reducer including a new mechanism for transmitting rotation from the input gear to the crankshaft.

More specifically, another object of the present invention is to provide a speed reducer capable of eliminating design limitations which have been imposed by the spur gear.

More specifically, still another object of the present invention is to eliminate occurrence of a backlash between the spur gear and the crankshaft in the conventional speed reducer.

Other objects of the present invention will be apparent with reference to the entire description in this specification.

A speed reducer according to one embodiment of the present invention includes a crankshaft and a speed reducing mechanism. The crankshaft includes a gear portion driven by rotation from a drive source and a journal portion formed integrally with the gear portion. The crankshaft rotates about an axis of the journal portion. The speed reducing mechanism decelerates rotation of the crankshaft and outputs the decelerated rotation.

In one embodiment of the present invention, the gear portion meshes with an input gear, the input gear transmitting rotation from the drive source. The gear portion may directly mesh with the input gear.

In one embodiment of the present invention, the gear portion has external teeth meshing with the input gear.

In one embodiment of the present invention, the external teeth have the shape of an involute curve.

In one embodiment of the present invention, the external teeth define a part of an outer surface of the crankshaft.

In one embodiment of the present invention, the journal portion has a columnar shape with a diameter equal or substantially equal to an addendum circle diameter of the external teeth.

The speed reducer according to one embodiment of the present invention includes another input gear different from the input gear and an external gear having external teeth meshing with the other input gear, the external gear being mounted to the crankshaft.

In one embodiment of the present invention, a ratio between the number of teeth of the input gear and the number of teeth of the gear portion is different from a ratio between the number of teeth of the other input gear and the number of the external teeth.

A speed reducer according to one embodiment of the present invention includes an input gear for transmitting rotation from a drive source, a ring gear, a crankshaft configured to rotate about an axis, and a speed reducing mechanism for decelerating rotation of the crankshaft and outputting the decelerated rotation. The ring gear has external teeth and internal teeth, the external teeth meshing with the input gear. The crankshaft has external teeth meshing with the internal teeth.

One embodiment of the present invention relates to a robot. The robot includes any one of the above-described speed reducers.

Advantages

According to one embodiment of the present invention, there is provided a new mechanism for transmitting rotation from an input gear to a crankshaft.

DESCRIPTION OF EXAMPLE EMBODIMENTS

Figure 1:
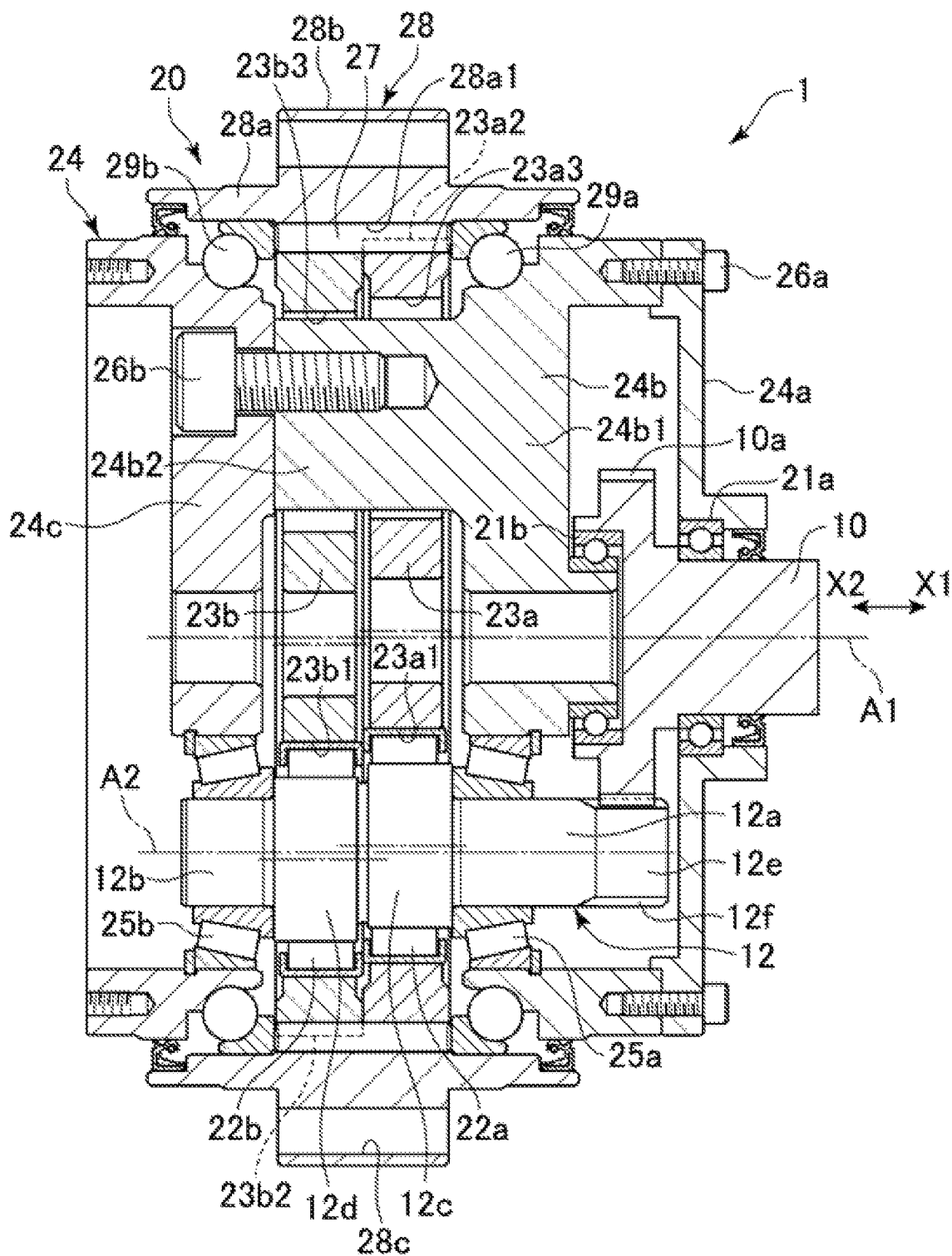
FIG. 1 is a sectional view showing a section of a speed reducer according to one embodiment of the present invention cut along a rotation axis thereof.

The following describes various embodiments of the present invention with reference to the appended drawings. In the drawings, constituent elements common to different views are denoted by the same reference signs. It is to be noted that, for the sake of convenience of description, the drawings are not necessarily depicted to scale.

Figure 2:
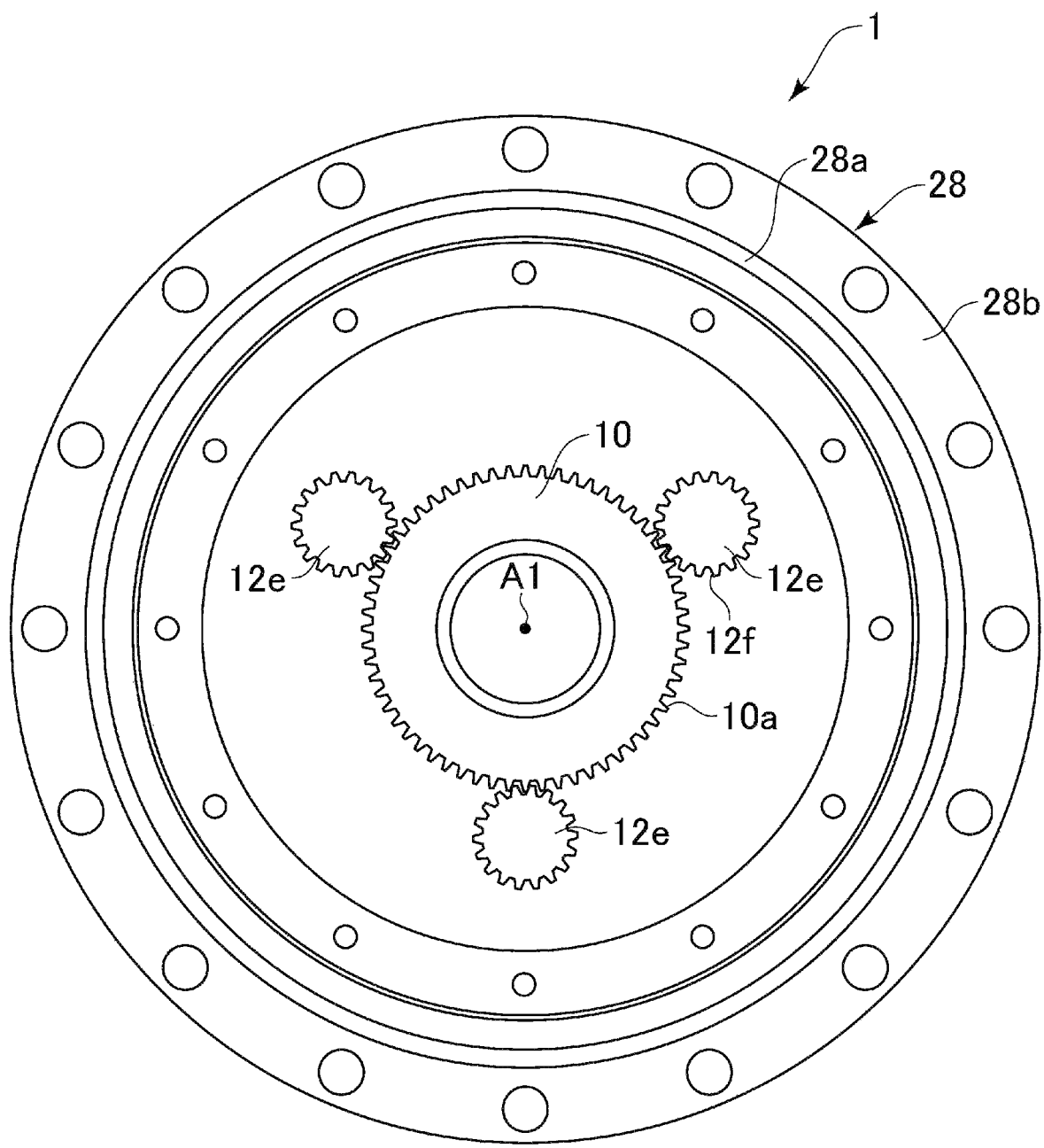
FIG. 2 is a view of the speed reducer shown in FIG. 1 as seen from a center axis direction thereof.
Figure 3:
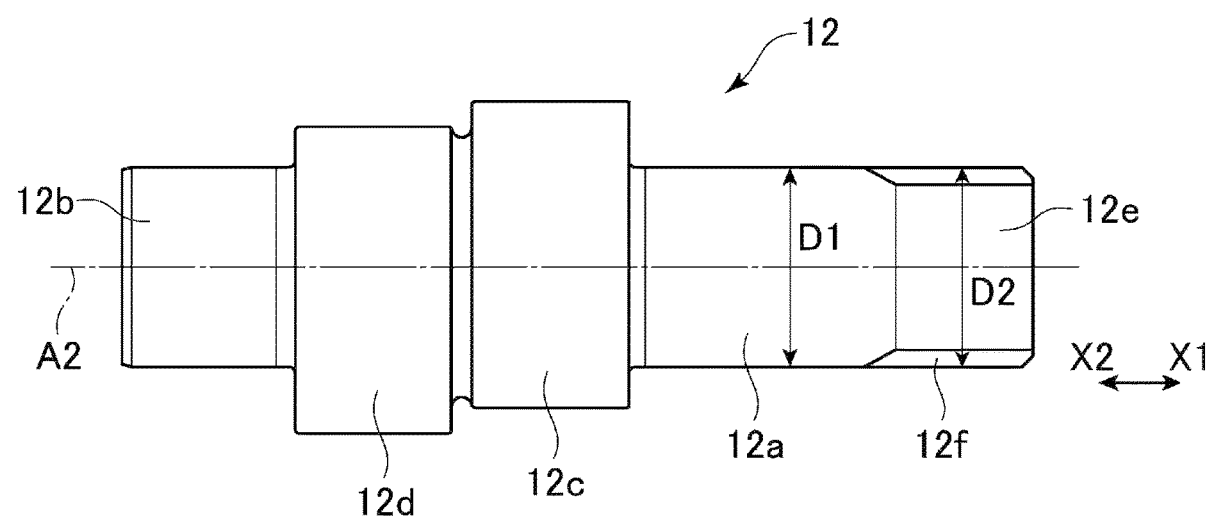
FIG. 3 is a view showing a crankshaft included in the speed reducer shown in FIG. 1.

A speed reducer 1 according to one embodiment of the present invention will now be described with reference to FIGS. 1 to 3. FIG. 1 is a sectional view showing a section of the speed reducer 1 along a center axis A1. FIG. 2 is a view schematically showing the speed reducer 1 as seen from a direction of the center axis A1. FIG. 3 is a view showing a crankshaft 12 included in the speed reducer 1.

These drawings show the speed reducer 1 of an eccentric oscillating type as a type of speed reducer to which the present invention is applicable. The speed reducer 1 includes an input gear 10, the crankshaft 12, and a speed reducing mechanism 20.

The input gear 10 transmits, to the crankshaft 12, rotation inputted from an unshown drive source. The drive source is, for example, an electric motor. The input gear 10 has external teeth 10a, the number of the external teeth 10a being Z1. The input gear 10 is mounted to an after-mentioned carrier 24 (specifically, a first carrier member 24a) via a bearing 21a. By this configuration, the input gear 10 is supported rotatably with respect to the carrier 24.

The crankshaft 12 is a substantially columnar member extending along an axis A2. The crankshaft 12 includes a gear portion 12e provided with external teeth 12f, the number of the external teeth 12f being Z2. The external teeth 12f directly mesh with the external teeth 10a of the input gear 10. With the external teeth 10a meshing with the external teeth 12f, rotation of the input gear 10 is transmitted to the crankshaft 12. The crankshaft 12 will be described in more detail later.

The speed reducing mechanism 20 decelerates rotation inputted from the crankshaft 12 and outputs the decelerated rotation to a subject device to be driven. The decelerated rotation is outputted, to the subject device, in the form of rotation about the center axis A1. The speed reducer 1 may be provided in an industrial robot. In this case, the subject device to be driven is, for example, an arm of the industrial robot. The speed reducing mechanism 20 will be described in more detail later.

Next, the crankshaft 12 will now be more specifically described. The crankshaft 12 is a substantially columnar member extending along the axis A2 and rotates about (revolves on) the axis A2 by input of rotation transmitted from the input gear 10. The crankshaft 12 includes, in addition to the above-described gear portion 12e, a first journal portion 12a, a second journal portion 12b, an eccentric portion 12c, and an eccentric portion 12d. The first journal portion 12a, the second journal portion 12b, the eccentric portion 12c, the eccentric portion 12d, and the gear portion 12e are formed integrally. In other words, the first journal portion 12a, the second journal portion 12b, the eccentric portion 12c, the eccentric portion 12d, and the gear portion 12e have such a one-piece structure that they do not move relative to each other in a circumferential direction about the axis A2.

Each of the first journal portion 12a and the second journal portion 12b has a columnar shape extending in an axis A2 direction. The first journal portion 12a is supported to the carrier 24 (specifically, a second carrier member 24b) by a conical roller bearing 25a, and the second journal portion 12b is supported to the carrier 24 (specifically, a third carrier member 24c) by a conical roller bearing 25b.

In the axis A2 direction, the eccentric portion 12c is provided on the X2 side relative to the first journal portion 12a. In the axis A2 direction, the eccentric portion 12d is provided on the X2 side relative to the eccentric portion 12c. In one embodiment, the eccentric portion 12c and the eccentric portion 12d each have a cylindrical shape. In this case, as viewed from the axis A2 direction, the eccentric portion 12c and the eccentric portion 12d each have a circular shape having a center radially displaced from the axis A2. That is, the eccentric portion 12c and the eccentric portion 12d are eccentric with respect to the axis A2. The eccentric portion 12c and the eccentric portion 12d are different in phase from each other. For example, the eccentric portion 12c and the eccentric portion 12d are mutually out of phase by 180°.

In the axis A2 direction, the gear portion 12e is provided on the X1 side relative to the first journal portion 12a. That is, the gear portion 12e is provided on an opposite side to the eccentric portion 12c with respect to the first journal portion 12a. The gear portion 12e has a substantially columnar shape. The gear portion 12e is integral with the first journal portion 12a and thus have a one-piece structure therewith. When the gear portion 12e does not rotate relative to the first journal portion 12a about the axis A2, the gear portion 12e can be said to be integral with the first journal portion 12a. In a case where two members are spline-connected to each other, a void is provided between a male spline and a female spline, and the two members are rotatable about an axis at least by an amount corresponding to this void. For this reason, herein, such two spline-connected members are not "integral" with each other and hence are not said to have an "integral one-piece structure." The gear portion 12e may be provided directly integrally with the first journal portion 12a or may be provided integrally with the first journal portion 12a via any other member included in the crankshaft 12. When the any other member does not rotate relative to both the gear portion 12e and the first journal portion 12a about the axis A2, the gear portion 12e can be said to be provided integrally with the first journal portion 12a via the any other member.

The gear portion 12e has the external teeth 12f formed on a side surface thereof. The gear portion 12e is configured and disposed so that the external teeth 12f mesh with the input gear 10. The external teeth 12f directly mesh with the input gear 10. In other words, the external teeth 12f mesh with the input gear 10 without use of any other gear such as a spur gear therebetween. The external teeth 12f are provided as a part of the gear portion 12e. That is, the external teeth 12f are a part of the gear portion 12e and thus are also a part of the crankshaft 12. Accordingly, the external teeth 12f of the gear portion 12e define a part of an outer surface of the crankshaft 12. Specifically, the external teeth 12f define a part or the entirety of the side surface of the gear portion 12e.

The external teeth 12f are formed by, for example, performing gear cutting on a part of a side surface of a columnar base member. This particular area of the columnar base member subjected to the gear cutting constitutes the external teeth 12f, and the other area of the columnar base member not subjected to the gear cutting constitutes the first journal portion 12a and other constituent elements of the crankshaft 12.

An addendum circle diameter of the external teeth 12f (or simply a diameter of the gear portion 12e) may be equal or substantially equal to a diameter of the first journal portion 12a. As shown in FIG. 3, in the embodiment illustrated, the first journal portion 12a has a diameter D1, and the external teeth 12f have an addendum circle diameter D2. In one embodiment, D1 and D2 are equal or substantially equal to each other. Herein, when a difference (D2−D1) between the addendum circle diameter D2 of the external teeth 12f and the diameter D1 of the first journal portion 12a falls within 5% of the diameter D1 of the first journal portion 12a, the addendum circle diameter D2 of the external teeth 12f and the diameter D1 of the first journal portion 12a are regarded as being substantially equal to each other. The external teeth 12f may have the shape of an involute curve. The first journal portion 12a and the second journal portion 12b may be equal in diameter.

Next, the speed reducing mechanism 20 will now be more specifically described. In the embodiment illustrated, the speed reducing mechanism 20 includes external gears 23a and 23b, the carrier 24, and a case 28.

The external gear 23a and the external gear 23b both have a substantially ring shape. At a center of each of the external gear 23a and the external gear 23b, a through hole is provided to extend along the center axis A1. Furthermore, the external gear 23a has a crank hole 23a1, and the external gear 23b has a crank hole 23b1. The crank hole 23a1 is a through hole penetrating the external gear 23a in an axial direction along the center axis A1 at a position out of alignment on a radially outer side with the center axis A1. The crank hole 23b1 is a through hole penetrating the external gear 23b in the axial direction along the center axis A1 at a position out of alignment on a radially outer side with the center axis A1. The crankshaft 12 is inserted through the crank hole 23a1 and the crank hole 23b1. The crank hole 23a1 and the crank hole 23b1 house a part of the crankshaft 12. In the embodiment illustrated, the crankshaft 12 is disposed so that the eccentric portion 12c is positioned in the crank hole 23a1 and the eccentric portion 12d is positioned in the crank hole 23b1. A needle bearing 22a is provided between the eccentric portion 12c and the crank hole 23a1, and a needle bearing 22b is provided between the eccentric portion 12d and the crank hole 23b1. By this configuration, the external gear 23a is supported to the eccentric portion 12c of the crankshaft 12 via the needle bearing 22a, and the external gear 23b is supported to the eccentric portion 12d of the crankshaft 12 via the needle bearing 22b.

The external gears 23a and 23b each have a through hole for receiving an after-mentioned boss 24b2 of the second carrier member 24b. Specifically, the external gear 23a has a through hole 23a3 on a radially outer side with respect to the center axis A1, and the external gear 23b has a through hole 23b3 on a radially outer side with respect to the center axis A1. The though hole 23a3 and the through hole 23b3 are provided at positions opposed to each other. Although FIG. 1 shows the single through hole 23a3 and the single through hole 23b3, the external gear 23a may have a plurality of through holes 23a3, and the external gear 23b may have a plurality of through holes 23b3.

The external gear 23a and the external gear 23b both have an external gear. Specifically, the external gear 23a has external teeth 23a2, and the external gear 23b has external teeth 23b2. When seen from the direction of the center axis A1, the external gear 23a and the external teeth 23b2 each have the shape of, for example, a pericycloid.

The case 28 is provided on a radially outer side of the external gear 23a and the external gear 23b. The case 28 includes a case body 28a having a hollow cylindrical shape and a flange 28b provided on a radially outer side of the case body 28a. The flange 28b has a bolt hole extending parallel to the center axis A1. For example, a subject device to be driven (not shown) is coupled to the flange 28b. The subject device to be driven is, for example, an arm of an industrial robot. The subject device to be driven can be coupled to the flange 28b by using a bolt.

On an inner peripheral surface of the case body 28a, a plurality of grooves 28a1 are formed to extend along the center axis A1. In other words, the case body 28a has the plurality of grooves 28a1 extending along the center axis A1. Pins 27 are provided in the plurality of grooves 28a1, respectively. The number of the pins 27 is different from the number of teeth of each of the external gears 23a and 23b. In the embodiment illustrated, the number of the pins 27 is larger by one than the number of teeth of each of the external gears 23a and 23b. An equation Z4−Z3=1 holds, where the number of teeth of each of the external gears 23a and 23b is indicated as Z3 and the number of the pins 27 is indicated as Z4.

The carrier 24 is provided on a radially inner side of the case 28. The carrier 24 is provided rotatably relative to the case 28. The carrier 24 includes the first carrier member 24a, the second carrier member 24b, and the third carrier member 24c.

The first carrier member 24a has, at a center thereof, a through hole extending in a center axis A1 direction. The input gear 10 is supported in this through hole. The input gear 10 is supported rotatably to the first carrier member 24a via the bearing 21a. The input gear 10 is supported rotatably to the after-mentioned second carrier member 24b via a bearing 21b.

In the axial direction along the center axis A1, the second carrier member 24b is provided on the X2 side relative to the first carrier member 24a, and in the axial direction along the center axis A1, the third carrier member 24c is provided on the X2 side relative to the second carrier member 24b. The first carrier member 24a and the second carrier member 24b are coupled using a bolt 26a, and the second carrier member 24b and the third carrier member 24c are coupled using a bolt 26b.

A gap is provided between the second carrier member 24b and the third carrier member 24c. The external gear 23a and the external gear 23b are disposed in this gap between the second carrier member 24b and the third carrier member 24c.

The second carrier member 24b includes a disc-shaped base 24b1 and the boss 24b2 protruding in an X2 direction on a radially outer side with respect to the center axis A1. The boss 24b2 has a bolt hole for receiving the bolt 26b.

The second carrier member 24b is supported to the case 28 via a main bearing 29a. The third carrier member 24c is supported to the case 28 via a main bearing 29b. In this manner, the second carrier member 24b and the third carrier member 24c are mounted rotatably relative to the case 28. The first carrier member 24a, the second carrier member 24b, and the third carrier member 24c are coupled using the bolt 26a and the bolt 26b, and thus the first carrier member 24a, the second carrier member 24b, and the third carrier member 24c integrally rotate relative to the case 28.

Each of the second carrier member 24b and the third carrier member 24c has a through hole for receiving the crankshaft 12. The crankshaft 12 is supported to the second carrier member 24b via the conical roller bearing 25a and to the third carrier member 24c via the conical roller bearing 25b. Thus, the crankshaft 12 can rotate relative to the second carrier member 24b and the third carrier member 24c.

The carrier 24 is connected to other members so that revolution thereof is restricted. In a case where the case 28 is coupled to an arm of an industrial robot, the carrier 24 is connected to, for example, a seating of the industrial robot, so that revolution of the carrier 24 is restricted. The seating of the industrial robot is installed by fixing the industrial robot on a fixed surface such as a floor at an installation location of the industrial robot.

Next, an operation of the speed reducer 1 will now be described. When the input gear 10 rotates under a rotational drive force from the drive source, the rotation is transmitted to the gear portion 12e of the crankshaft 12, the gear portion 12e directly meshing with the input gear 10. The rotation of the input gear 10 is accelerated or decelerated at a speed ratio Z2/Z1, where the number of teeth of the input gear 10 is indicated as Z1 and the number of teeth of the external teeth 12f of the gear portion 12e is indicated as Z2, and the accelerated or decelerated rotation is transmitted to the crankshaft 12. The rotation inputted from the input gear 10 causes the eccentric portion 12c and the eccentric portion 12d of the crankshaft 12 to rotate eccentrically about the axis A2. By this configuration, when the crankshaft 12 revolves on the axis A2, the external gears 23a and 23b each rotate relative to the case 28 by an amount corresponding to a difference between the number of the pins 27 of the case 28 and the number of teeth of a corresponding one of the external gears 23a and 23b. In the embodiment illustrated, since revolution of the carrier 24 is restricted, the case 28 rotates by one tooth, which is a difference between the number of the pins 27 and the number of teeth of each of the external gears 23a and 23b. In this manner, rotation of the crankshaft 12 is decelerated at a speed reduction ratio expressed as (the number of teeth of each of the external gears 23a and 23b)/(the number of the pins 27–the number of teeth of each of the external gears 23a and 23b), and the decelerated rotation is transmitted to the case 28. The speed reduction ratio is expressed as Z3/(Z4−Z3), where the number of teeth of each of the external gears 23a and 23b is indicated as Z3 and the number of the pins 27 is indicated as Z4. In a case where the difference between the number of the pins 27 and the number of teeth of each of the external gears 23a and 23b is 1, the speed reduction ratio is equal to the number of teeth of each of the external gears 23a and 23b (=Z3).

As thus described, in a first speed reducing unit composed of the input gear 10 and the crankshaft 12, rotation inputted from the drive source to the speed reducer 1 is decelerated at a first speed reduction ratio determined based on the number Z1 of teeth of the input gear 10 and the number Z2 of teeth of the crankshaft 12, and the decelerated rotation is outputted to the speed reducing mechanism 20. In the speed reducing mechanism 20, the rotation is further decelerated at a second speed reduction ratio, and the further decelerated rotation is outputted from the case 28 to a subject device. Thus, the speed reducer 1 is capable of decelerating rotation from the drive source at a high speed reduction ratio represented by a product of the first speed reduction ratio and the second speed reduction ratio.

Next, a speed reducer 101 according to another embodiment of the present invention will now be described with reference to FIG. 4. The speed reducer 101 according to the other embodiment of the present invention is different from the speed reducer 1 shown in FIG. 1 in that a spur gear is coupled to an end of a crankshaft 12 opposite to a gear portion 12e, and a rotational drive force from another input gear different from an input gear 10 is transmitted to the spur gear. In the speed reducer 101 shown in FIG. 4, constituent elements that are the same as or similar to those of the speed reducer 1 shown in FIG. 1 are denoted by reference signs that are the same as or similar to those in FIG. 1, and detailed descriptions thereof are omitted.

Figure 4:
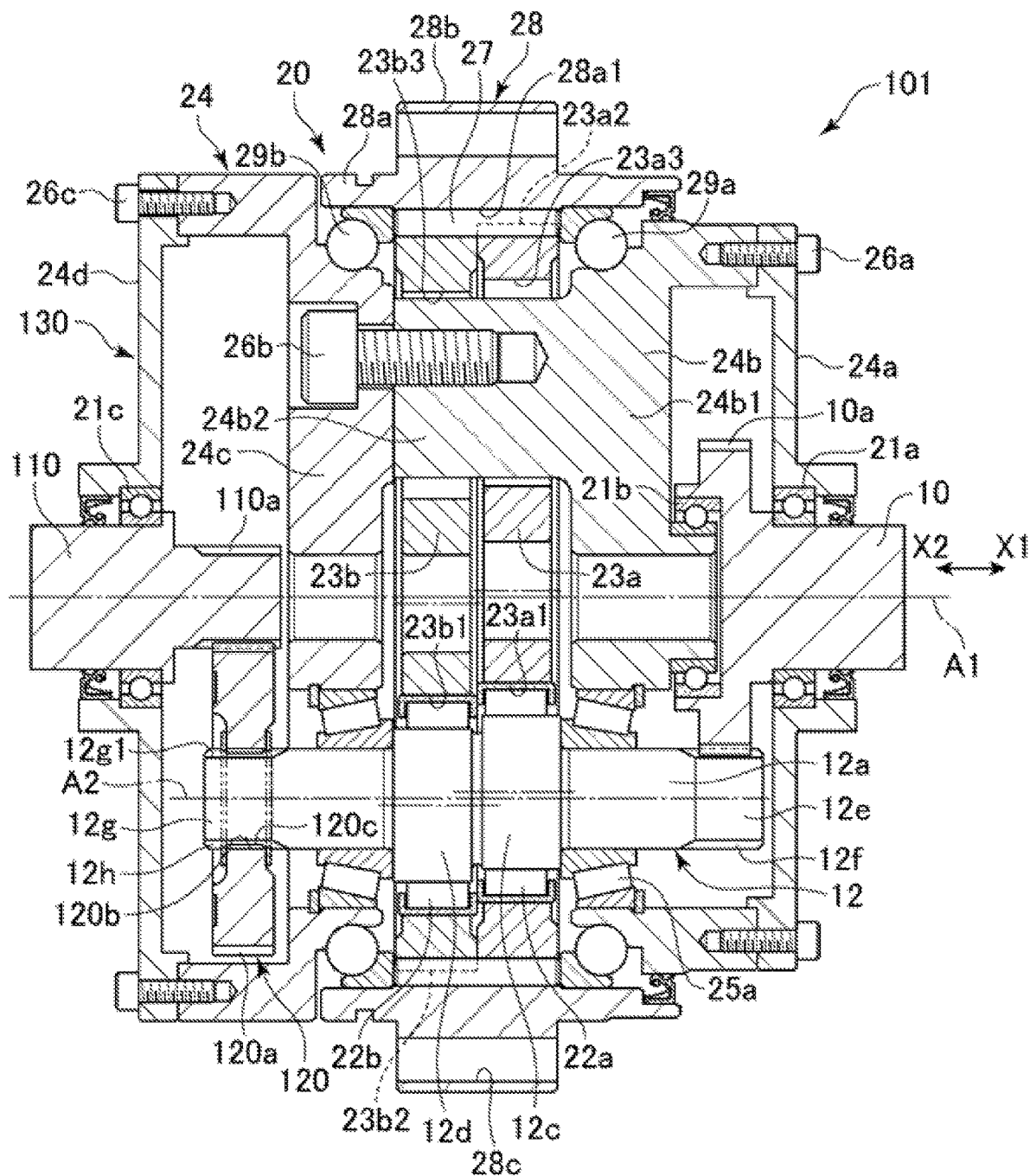
FIG. 4 is a sectional view showing a section of a speed reducer according to another embodiment of the present invention cut along a center axis thereof.

The speed reducer 101 shown in FIG. 4 includes an input gear 110 in addition to the input gear 10. A rotational drive force from a drive source such as an electric motor is inputted to the input gear 110. The input gear 110 has external teeth 110a, the number of the external teeth 110a being Z5. The input gear 110 is mounted to a fourth carrier member 24d via a bearing 21c. The fourth carrier member 24d is fastened to a third carrier member 24c by using a bolt 26c.

The crankshaft 12 includes a coupling portion 12g provided on an opposite side to the gear portion 12e in an axis A2 direction. In the axis A2 direction, the coupling portion 12g is provided on the X2 side relative to a second journal portion 12b. The coupling portion 12g has a substantially columnar shape. The coupling portion 12g is integral with the second journal portion 12b and thus have a one-piece structure therewith. An external tooth spline 12g1 is provided on an outer surface (specifically, a side surface surrounding an axis A2) of the coupling portion 12g.

A spur gear 120 has external teeth 120a, the number of the external teeth 120a being Z6, and a through hole 120b. The through hole 120b is a through hole penetrating the spur gear 120 at a radial center of the spur gear 120 in a direction along the axis A2. An internal tooth spline 120c is provided in the through hole 120b.

The spur gear 120 is disposed so that the external teeth 120a thereof mesh with the external teeth 110a of the input gear 110. By this configuration, rotation of the input gear 110 is transmitted to the spur gear 120. The rotation of the input gear 110 is transmitted to the spur gear 120 at a speed ratio determined based on the number of the external teeth 110a of the input gear 110 and the number of the external teeth 120a of the spur gear 120. The rotation of the input gear 110 is changed in speed at a speed ratio Z6/Z5, where the number of the external teeth 110a of the input gear 110 is indicated as Z5 and the number of the external teeth 120a of the spur gear 120 is indicated as Z6, and the rotation changed in speed is transmitted to the spur gear 120. The number of the external teeth 110a and the number of the external teeth 120a may be set so that a speed ratio between the input gear 110 and the spur gear 120 (namely, a speed ratio between the input gear 110 and the crankshaft 12) is different from a speed ratio between the input gear 10 and the crankshaft 12.

The spur gear 120 is coupled to the crankshaft 12. Specifically, the coupling portion 12g of the crankshaft 12 is inserted through the through hole 120b so that the internal tooth spline 120c provided in the through hole 120b meshes with the external tooth spline 12b1 provided on the coupling portion 12g, and thus the spur gear 120 is coupled to the crankshaft 12. The spur gear 120 is spline-connected to the crankshaft 12, and thus rotation of the spur gear 120 can be transmitted to the crankshaft 12. Since the spur gear 120 and the crankshaft 12 are spline-connected, the spur gear 120 and the crankshaft 12 are not integral with each other. That is, the spur gear 120 and the crankshaft 12 are separate members.

Next, an operation of the speed reducer 101 will now be described. In the speed reducer 101, a rotational drive force from the drive source is inputted to either the input gear 10 or the input gear 101. In a case where a rotational drive force is inputted to the input gear 10, the speed reducer 101 operates similarly to the speed reducer 1. When a rotational drive force is inputted from the drive source to the input gear 110, rotation of the input gear 110 is accelerated or decelerated at a speed ratio determined based on the number of the external teeth 110a of the input gear 110 and the number of the external teeth 120a of the spur gear 120, and the accelerated or decelerated rotation is transmitted to the spur gear 120. Since the spur gear 120 and the crankshaft 12 are spline-connected, when the spur gear 120 rotates, the crankshaft 12 rotates about the axis A2. When the crankshaft 12 revolves on the axis A2, external gears 23a and 23b each rotate relative to a case 28 by an amount corresponding to a difference between the number of pins 27 of the case 28 and the number of teeth of a corresponding one of the external gears 23a and 23b. In this manner, rotation of the crankshaft 12 is decelerated, and the decelerated rotation is transmitted to the case 28 and outputted from the case 28 to a subject device.

Figure 5:
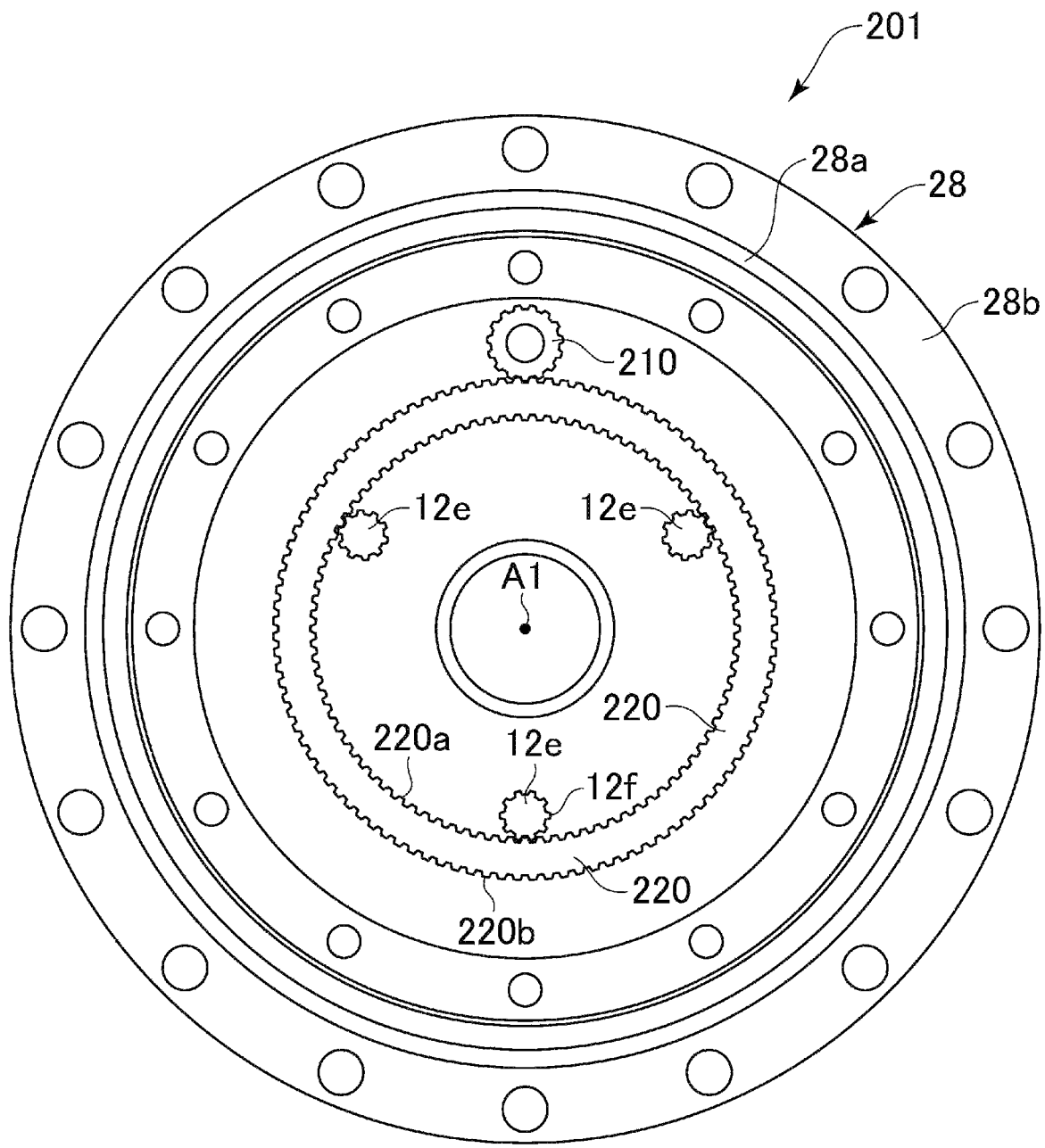
FIG. 5 is a view of a speed reducer according to still another embodiment of the present invention as seen from a center axis direction thereof.

Next, a speed reducer 201 according to still another embodiment of the present invention will now be described with reference to FIG. 5. The speed reducer 201 according to the still another embodiment of the present invention is different from the speed reducer 1 whose rotation is directly transmitted from the input gear 10 to the crankshaft 12 in that rotation of the speed reducer 201 is transmitted from an input gear to a crankshaft 12 via a ring gear 220. The speed reducer 201 includes a speed reducing mechanism similar to the speed reducing mechanism 20 of the speed reducer 1. A description of the speed reducing mechanism of the speed reducer 201 is omitted.

The speed reducer 201 includes an input gear 210 in place of the input gear 10. The input gear 210 is disposed at a position out of alignment on a radially outer side with a center axis A1. The input gear 210 transmits rotation inputted from an unshown drive source to the ring gear 220.

The ring gear 220 is provided on a radially more inner side than the input gear 210. The ring gear 220 has internal teeth 220a and external teeth 220b. The input gear 201 meshes with the external teeth 220b of the ring gear 220.

A gear portion 12e of the crankshaft 12 is provided on an inner side of the ring gear 220, and external teeth 12f of the gear portion 12e mesh with the internal teeth 220a of the ring gear 220. Accordingly, in a case where the number of the external teeth 220b of the ring gear 220 is set to be constant (that is, in a case where a position of the input gear 210 and the number of teeth of the input gear 210 are set to be constant), the number of the internal teeth 220a of the ring gear 220 can be changed depending on a width (a radial dimension) of the ring gear 220. Therefore, in the case where the number of the external teeth 220b of the ring gear 220 is set to be constant, a speed ratio between the ring gear 220 and the crankshaft 12 can be adjusted depending on the width (the radial dimension) of the ring gear 220.

Next, an operation of the speed reducer 201 will now be described. When a rotational drive force is inputted from the drive source to the input gear 210, rotation of the input gear 210 is transmitted to the ring gear 220 and then to the crankshaft 12. Under the rotational drive force inputted from the input gear 210 via the ring gear 220, the crankshaft 12 revolves on an axis A2. When the crankshaft 12 revolves, external gears 23a and 23b each rotate relative to a case 28 by an amount corresponding to a difference between the number of pins 27 of the case 28 and the number of teeth of a corresponding one of the external gears 23a and 23b. In this manner, rotation of the crankshaft 12 is decelerated, and the decelerated rotation is transmitted to the case 28 and outputted from the case 28 to a subject device.

Next, advantageous effects of the foregoing embodiments will now be described. In the foregoing embodiments, the crankshaft 12 includes the gear portion 12e meshing with the input gear 10 and the journal portion 12a provided integrally with the gear portion 12e, and the crankshaft 12 rotates about the axis A2 as the input gear 10 rotates. In this manner, rotation from the input gear 10 is directly inputted to the crankshaft 12 without use of a spur gear therebetween. For this reason, radial dimensions of the speed reducers 1 and 101 are not limited by the spur gear. By this configuration, the degree of design freedom of the speed reducers 1 and 101 can be increased. In particular, the degree of design freedom in terms of radial dimensions of the constituent components of the speed reducers 1 and 101 can be increased. For example, in a case where a through hole is provided in each of the external gears 23a and 23b and the carrier 24 along the center axis A1, a radial dimension of the through hole can be increased. By this configuration, a space for housing wiring can be readily secured, the wiring being connected to a subject device to which rotation is transmitted and to the drive source.

In the foregoing embodiments, since rotation from the input gear 10 is directly inputted to the crankshaft 12 without use of a spur gear therebetween, compared with the conventional speed reducer using the spur gear, it is possible to suppress occurrence of a backlash at the time when rotation is transmitted from an input gear to a crankshaft. The external teeth 12f of the gear portion 12e of the crankshaft 12 are formed in an involute tooth shape, and thus it is possible to suppress occurrence of a backlash between the input gear 10 and the gear portion 12e.

In the foregoing embodiments, since rotation from the input gear 10 is directly inputted to the crankshaft 12 without use of a spur gear therebetween, there is no need for the spur gear, so that the number of components of the speed reducers 1 and 101 can be reduced. The conventional speed reducer uses not only a main body of the spur gear but also a retaining ring for preventing the spur gear from falling off from the crankshaft. According to the foregoing embodiments, the spur gear and the retaining ring can be omitted.

In the foregoing embodiments, since rotation from the input gear 10 is directly inputted to the crankshaft 12 without use of a spur gear therebetween, adjustment of a speed ratio between the input gear 10 and the crankshaft 12 is facilitated. For example, in a case of adjusting a speed ratio by increasing a diameter and the number of teeth of an input gear, in the conventional speed reducer, a radial thickness (a dimension represented by a difference between a dedendum circle radius of the spur gear and a radius of a through hole of the spur gear) of the spur gear needs to be decreased. This might lead to a decrease in strength of the spur gear. In order to secure the strength of the spur gear while decreasing the radial thickness of the spur gear, an axial thickness of the spur gear needs to be increased. This method, however, undesirably results in an increase in axial dimension of the speed reducer. According to the foregoing embodiments, in a case of adjusting a speed ratio by increasing a diameter of the input gear 10, this purpose could be fulfilled by decreasing a diameter of the gear portion 12e of the crankshaft 12. The gear portion 12e can be formed in a solid columnar shape, and thus the strength of the gear portion 12e can be readily maintained compared with a hollow spur gear.

In the foregoing embodiments, the addendum circle diameter D2 of the external teeth 12f of the gear portion 12e of the crankshaft 12 is equal or substantially equal to the diameter D1 of the first journal portion 12a. By this configuration, a contact ratio between the input gear 10 and the gear portion 12e can be increased.

According to the foregoing embodiments, the input gear 110 different from the input gear 10 is provided, and rotation from the input gear 110 is transmitted to the crankshaft 12 via the spur gear 120. Accordingly, dual input systems for inputting rotation to the crankshaft 12 can be obtained. By this configuration, for example, even when one of such dual input systems becomes inoperable, the speed reducer 101 can stay operable using the other of the dual input systems.

According to the foregoing embodiments, a ratio between the number Z1 of teeth of the input gear 10 and the number Z2 of the external teeth 12f of the gear portion 12e is different from a ratio between the number Z5 of the external teeth 110a of the input gear 110 and the number Z6 of the external teeth. By this configuration, a speed ratio can be changed between an input system for inputting rotation from the input gear 10 and an input system for inputting rotation from the input gear 110.

According to the foregoing embodiments, rotation of the input gear 210 is transmitted to the crankshaft 12 by the ring gear 220 having the external teeth 220b and the internal teeth 220a, the external teeth 220b meshing with the input gear 210. The use of the ring gear 220 makes it possible to transmit rotation of the input gear 210 to the crankshaft 12 without using a spur gear. Furthermore, in a case where a position of the input gear 210 and the number of teeth of the input gear 210 are set to be constant, the number of the internal teeth 220a of the ring gear 220 can be changed depending on a width (a radial dimension) of the ring gear 220. Accordingly, in the case where the position of the input gear 210 and the number of teeth of the input gear 210 are set to be constant, a speed ratio between the ring gear 220 and the crankshaft 12 can be adjusted depending on the width of the ring gear 220. Since there are almost no design limitations in terms of the width of the ring gear 220, according to the foregoing embodiments, rotation of the input gear 210 is transmitted to the crankshaft 12 by the ring gear 220, thereby enabling flexible setting of a speed ratio.

The dimensions, materials, and arrangements of the various constituent elements described herein are not limited to those explicitly described in the embodiments, and the various constituent elements can be modified to have any dimensions, materials, and arrangements within the scope of the present invention. Furthermore, constituent elements not explicitly described herein can also be added to the embodiments described, and it is also possible to omit some of the constituent elements described in the embodiments.

The foregoing embodiments may be adequately combined with each other. Any embodiment achieved by combining a plurality of embodiments can also constitute one embodiment of the present invention.

What is claimed is:

1. A speed reducer, comprising:
    an input gear configured to be operatively connected to a portion of a drive source, the input gear configured to receive rotation from the drive source as an input from the drive source to the speed reducer;
    a crankshaft including:
        a gear portion having external teeth, the external teeth being configured to directly mesh with the input gear; and
        a journal portion formed integrally with the gear portion,
    the crankshaft being configured to rotate about an axis of the journal portion; and
    a speed reducing mechanism for decelerating rotation of the crankshaft and outputting the decelerated rotation.

2. The speed reducer according to claim 1, wherein the external teeth have a shape of an involute curve.

3. The speed reducer according to claim 1, wherein the external teeth define a part of an outer surface of the crankshaft.

4. The speed reducer according to claim 1, wherein the journal portion has a columnar shape with a diameter equal or substantially equal to an addendum circle diameter of the external teeth.

5. The speed reducer according to claim 1, further comprising:
    another input gear different from the input gear; and
    an external gear having external teeth meshing with the other input gear, the external gear being mounted to the crankshaft.

6. The speed reducer according to claim 5, wherein a ratio between a number of teeth of the input gear and a number of teeth of the gear portion is different from a ratio between a number of teeth of the other input gear and a number of teeth of the external gear.

7. A robot comprising the speed reducer according to claim 1.

8. A speed reducer, comprising:
    an input gear for transmitting rotation from a drive source;
    a ring gear having external teeth and internal teeth, the external teeth meshing with the input gear;
    a crankshaft having a gear portion and a journal portion, the gear portion having external teeth meshing with the internal teeth, the journal portion formed integrally with the gear portion, the crankshaft being configured to rotate about an axis; and
    a speed reducing mechanism for decelerating rotation of the crankshaft and outputting the decelerated rotation,
    wherein the journal portion has a columnar shape with a diameter equal or substantially equal to an addendum circle diameter of the external teeth.

9. A speed reducer comprising:
    a crankshaft including:
        a gear portion meshing with an input gear, the input gear transmitting rotation from a drive source; and
        a journal portion formed integrally with the gear portion,
    the crankshaft being configured to rotate about an axis of the journal portion;
    a speed reducing mechanism for decelerating rotation of the crankshaft and outputting the decelerated rotation;
    another input gear different from the input gear; and
    an external gear having external teeth meshing with the other input gear, the external gear being mounted to the crankshaft,
    wherein the gear portion has external teeth meshing with the input gear; and
    wherein the journal portion has a columnar shape with a diameter equal or substantially equal to an addendum circle diameter of the external teeth.

* * * * *